Oct. 29, 1929.                P. DI MEDINA                 1,733,783
                    PHOTOGRAPHIC CAMERA FOR AUTOMOBILES
                            Filed Aug. 23, 1927

INVENTOR
Pedro Di Medina
BY
ATTORNEY

Patented Oct. 29, 1929

1,733,783

UNITED STATES PATENT OFFICE

PEDRO DI MEDINA, OF UMATILLA, OREGON

PHOTOGRAPHIC CAMERA FOR AUTOMOBILES

Application filed August 23, 1927. Serial No. 214,849.

This invention relates generally to automobiles, or the like, and has more particular reference to a novel photographic camera system for automobiles.

The invention has for an object the provision of a photographic camera system for automobiles adapted to photograph scenes of accidents in which the vehicles are involved, or photograph occupants in the car, when the car is used without authorization from the owner.

For further comprehension of the invention and of the objects and advantages thereof, reference will be had to the following description and accompanying drawing and to the appended claims in which the various novel features of the invention are more particularly set forth.

Referring to the accompanying drawing forming a material part of this disclosure.

Figure 1:
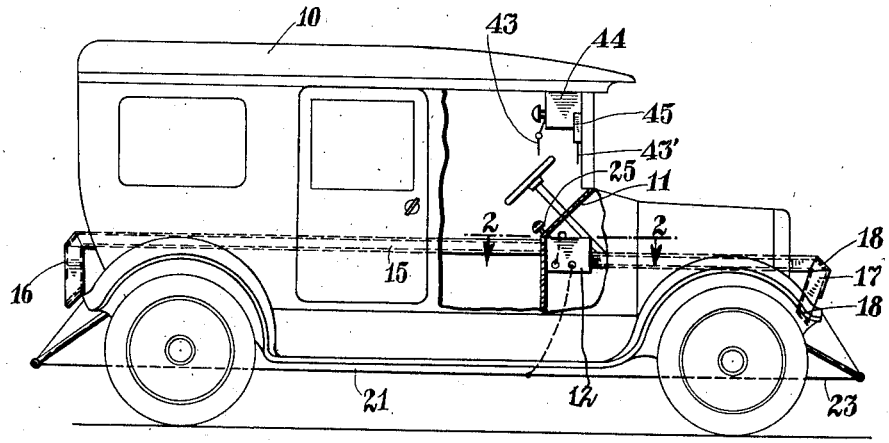
Fig. 1 is a side view of an automobile having the invention applied thereto.
Figure 2:
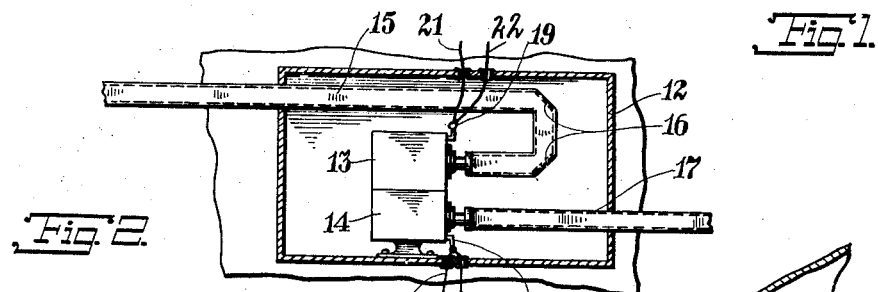
Fig. 2 is a horizontal fragmentary sectional view, taken on the line 2—2 of Fig. 1.
Figures 3, 4:
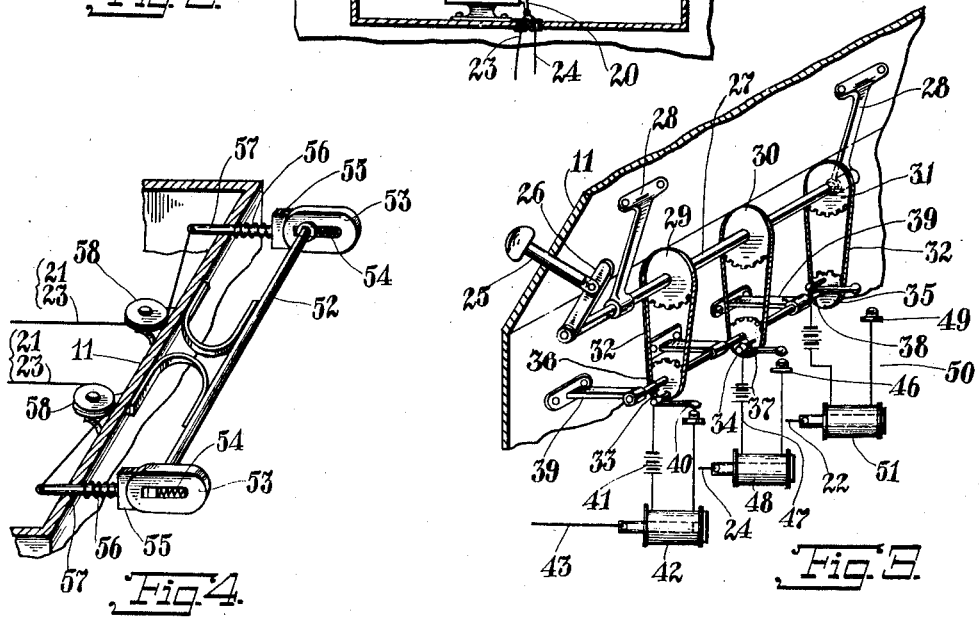
Fig. 3 is a fragmentary perspective view of the rear side of the panel board of the automobile.
Fig. 4 is a fragmentary, partly sectional, perspective view of a bumper arrangement for the car.

The reference numeral 10 indicates generally an automobile of common construction, provided with a panel board 11. Suitably mounted within the automobile 10 is a box 12, preferably of tin, and within the box, cameras 13 and 14 are secured. A bent tube 15 is provided with a plurality of mirrors 16 reflecting objects in the rear of the auto to camera 13, while another bent tube 17 provided with a plurality of mirrors 18 reflecting objects in front of the auto to camera 14. These cameras are preferably motion picture cameras, and are set into operation by motion on levers 19 and 20, caused by a movement of cords 21, 22, or 23 and 24. The cord 21 leads to the back of the car, while the cord 23 leads to the front of the car, and should the car meet in collision with another car, these cords will be moved, and the cameras set in operation. The pictures taken by the cameras will aid in determining whose fault caused the accident.

The panel board 11 is provided with a slidable handle 25 pivoted to an arm 26, secured to a shaft 27 supported by brackets 28 to the rear of the panel 11. The shaft 27 is provided with sprocket gears 29, 30 and 31 connected by chains 32 to sprocket wheels 33, 34 and 35 on shafts 36, 37 and 38, supported by brackets 39 to the panel 11. The shaft 36 is provided with a contact arrangement 40 in circuit with battery 41 and solenoid 42 having cord 43 attached to its core, and the cord being connected with a camera 44, positioned so that upon operation it takes a picture of the interior of the car and a branch 43′ connects with a flash-light 45 to properly illuminate the car when the picture is taken. The shaft 37 is provided with a contact arrangement 46 in circuit with battery 47 and solenoid 48 having cord 24 attached to its core, and as before stated this cord 24 operates camera 14. The shaft 38 is provided with a contact arrangement 49 in circuit with battery 50 and solenoid 51 having cord 22 attached to its core, and as before stated this cord 22 operates camera 13.

The front or rear bumper 52 of the car 11, slidably supports members 53 urged outwards by springs 54, and engaged by shoes 55 due to the action of springs 56, the shoe being supported on rods 57, slidably arranged in the car 11. The end of the rods 57 connect with cords 23 or 21, according as to whether bumper 52 is the front or rear bumper, and these cords are guided over pulleys 58 and to the cameras as beofre explained.

The operation of the device consists in the operation of cameras 13 and 14, as the members 53 are pressed inwards due to collision, and thereby photographing the scene, and when an unauthorized person plays with the car and depresses the handle 25, the camera 44 and flashlight 45 are operated, as well as cameras 13 and 14.

While I have illustrated and described the preferred form, construction, and arrangement of the several elements employed, it will be understood that the device is, nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

In combination with a bumper of an automobile, a block slidably mounted on the bumper, a spring acting between the bumper and the block for urging the block forwards, a rod slidably arranged in the automobile, a shoe on said rod, a spring urging the rod forwards so that the shoe engages the block, and a cord connected to the rod and to operate a camera mounted on the automobile, as a means for operating the camera upon backward motion of the block relative to the bumper.

In testimony whereof I have affixed my signature.

PEDRO DI MEDINA.